Aug. 27, 1957  L. R. BRAZIER  2,803,853
ROTARY MOLDING MACHINES
Filed May 22, 1953  2 Sheets-Sheet 1

INVENTOR.
LESLIE ROBERT BRAZIER
BY
ATTORNEY

Aug. 27, 1957 L. R. BRAZIER 2,803,853
ROTARY MOLDING MACHINES
Filed May 22, 1953 2 Sheets-Sheet 2

INVENTOR.
LESLIE ROBERT BRAZIER
BY Benj. J. Rauber
ATTORNEY

United States Patent Office 2,803,853
Patented Aug. 27, 1957

2,803,853

ROTARY MOLDING MACHINES

Leslie Robert Brazier, Streetly, England, assignor to Dunlop Tire and Rubber Corporation, Buffalo, N. Y., a corporation of New York Application May 22, 1953, Serial No. 356,758

Claims priority, application Great Britain April 1, 1952

6 Claims. (Cl. 18—20)

My present invention relates to rotary molding machines for the production of small articles in rubber or plastics.

It has been proposed to provide rotary molding machines for small articles in which a series of molds mounted in a circle on a rotating table are brought in turn into charging, molding and stripping zones in the circular path followed by each mold. Heat required during the molding operation has been provided by steam or electrical resistances and it has been found necessary to provide connections from a fixed energy source to heating elements associated with a series of molds rotating about a central axis.

My invention provides a molding machine in which the heating of the molds is effected by means in which complicated connections are not required.

In my invention a rotary molding machine comprises a rotatable circular table with an intermittent drive therefor, a series of molds arranged in a circle on the table co-axial therewith, means for opening and closing said molds, injection means whereby said molds are filled after closure with moldable material, and stationary electrical induction heating elements extending along the circular path described by the molds from a filling station to an opening station whereby moldable material within the molds is maintained at a molding temperature.

The induction elements are preferably enclosed within a tunnel covering a proportion of the molds. The tunnel extends over an arc of a circle, so that each mold passes through it as the table is rotated. High frequency induction heating can be employed but it may give rise to localized high temperatures near the outer surface of the molds, which is undesirable when molding rubber articles, and for this reason low voltage heating at about 50 cycles per second frequency is preferred.

In a preferred construction a horizontal circular table is rotatably mounted on a machine bed and provided with means for driving it intermittently. The molds are arranged in a circle on the upper surface of the table and are opened and closed by a series of hydraulic rams supplied with hydraulic fluid from a pump attached to the bed through a central rotary valve. An inverted U-shaped tunnel enclosing the heating elements extends partly round the circle to cover a proportion of the molds, the remaining molds being accessible for filling with moldable material from an injector and stripping the molded article.

The various features of my invention are illustrated, by way of example, in the accompanying drawings in which, Fig. 1 shows a cross-sectional elevation of a rotary molding machine embodying a preferred form of the invention, the injection means being omitted for the sake of clarity;

Figure 1:
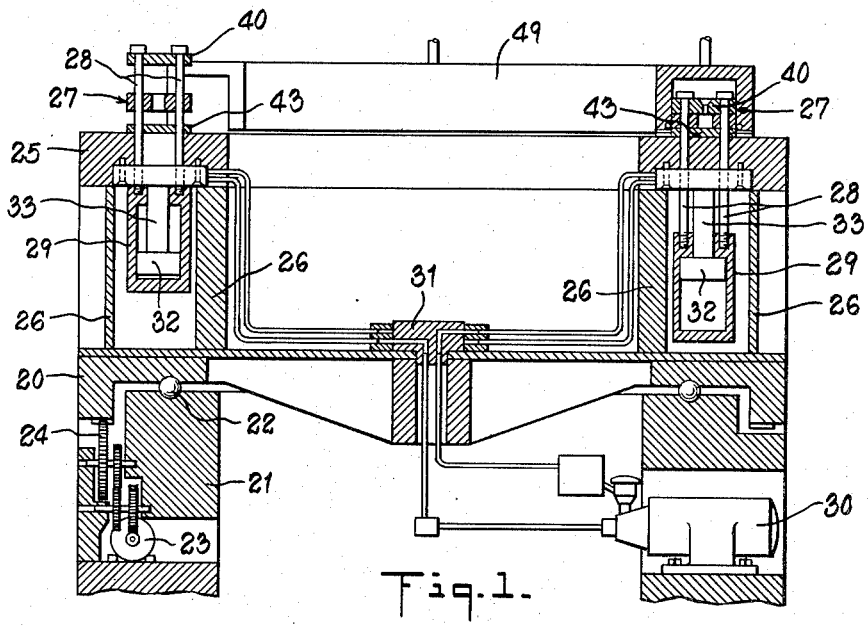

A flat circular table 20, Fig. 1, is rotatably mounted on a machine bed 21 by means of a ball race 22 therebetween and is driven by an electric motor 23 mounted on the bed 20 through a system of gearing 24 to provide intermittent rotation.

Adjacent the periphery of the table 20 and spaced inwardly therefrom is a raised annular platform 25 co-axial with the table. This platform is supported by two concentric walls 26, 26 upstanding from the table to leave a space between them below the platform. Mounted on the platform are single cavity molds 27, sixteen molds being shown by way of example, lower platens 43 of which are adjacent the platform and are equally spaced around the platform. The molds 27 are opened and closed by rods 28 from upper plates 40 of the molds connected to a series of hydraulic cylinders 29 mounted under the platform in the space between the walls 26, there being a separate cylinder 29 for each mold 27. Hydraulic fluid is supplied to the cylinders from a pump 30 located on the machine bed through a rotary valve 31 at the center of the table 20. The rotary valve 31 is arranged to admit fluid to one or the other end of each cylinder 29 according to the position of that cylinder with respect to a tunnel to be presently described. Enclosed within each cylinder 29 is a stationary piston 32 rigidly attached by a vertical piston rod 33 to the underside of the platform 25. When fluid is admitted to the cylinder on one or the other side of the piston, the cylinder moves vertically to open or close the mold.

Figure 3:
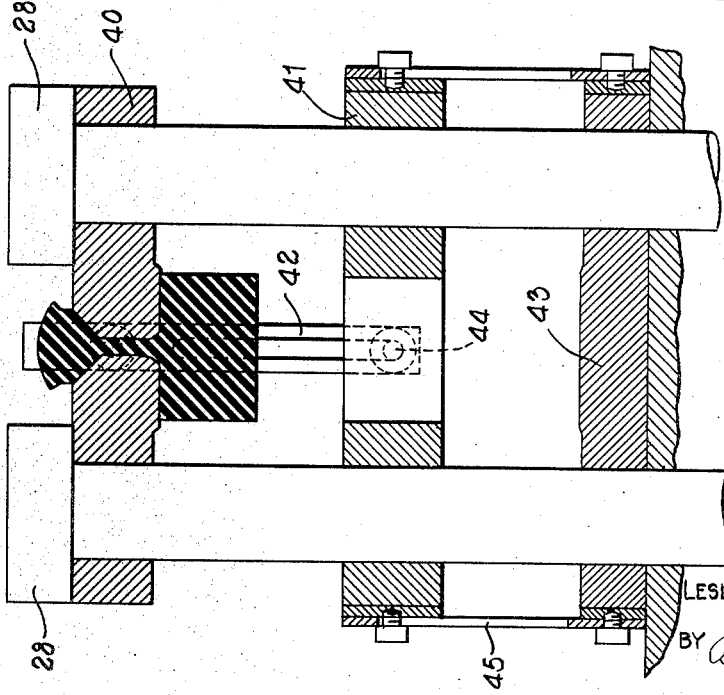
Fig. 3 shows on an enlarged scale, a cross-sectional elevation of a mold.

Each mold 27, Fig. 3, consists of two plates 40, 41 and a lower platen 43 whose contact surfaces when the molds are closed are limited to lands of $3/16''$ width at the edge of the cavity. These lands are case hardened and ground and a mold clamping force of up to 7 tons assists in preventing molding material within the mold from flashing. The lower plate 41 is connected to the upper plate 40 by projections 44 engaging in vertical slotted strips 42 secured to the upper plate. When the upper plate 40 is lifted by the rods 28 it moves freely initially until the projections 44 engage the lower ends of the slots in the strips 42 and the lower plate 41 is lifted with the upper plate 40 to separate the three parts of the mold. Further slotted guides 45 are also interposed between the lower plate 41 and the platen 43. When the upper plate 40 is lowered, the lower plate 41 descends with it until contact is made with the platen 43 whereupon the upper plate 40 only continues to descend, the projection 44 on the lower plate riding up the slotted strips 42.

The upper plate is adapted to provide a sprue sufficiently strong for the molded product to be lifted clear of the lower plate and the platen so that it may be sheared from the sprue by a side blow when the mold is opened.

The intermittent table drive is so arranged that the table moves on the distance between two adjacent molds at a time.

Figure 2:
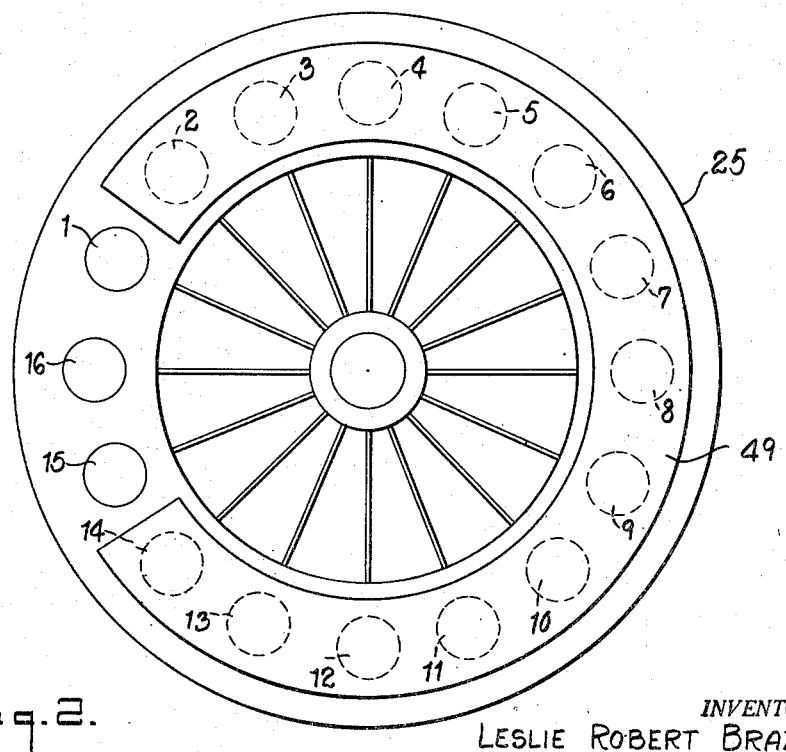
Fig. 2 shows a plan view of the machine shown in Fig. 1.

Extending over the platform in an arc of a circle but separate therefrom is a square-sided U-shaped tunnel 49, Figs. 1 and 2, the open side of which is lowermost to cover thirteen of the molds 29 mounted on the platform. Within the tunnel are a series of electrical induction elements (not shown) connected to a source of alternating current. In the case of a machine for molding rubber current is supplied from a source at a pressure of 18 volts at 50 C. P. S. frequency and the elements are spaced so that those at one end are closer together for a purpose as will be presently described.

Figure 4:
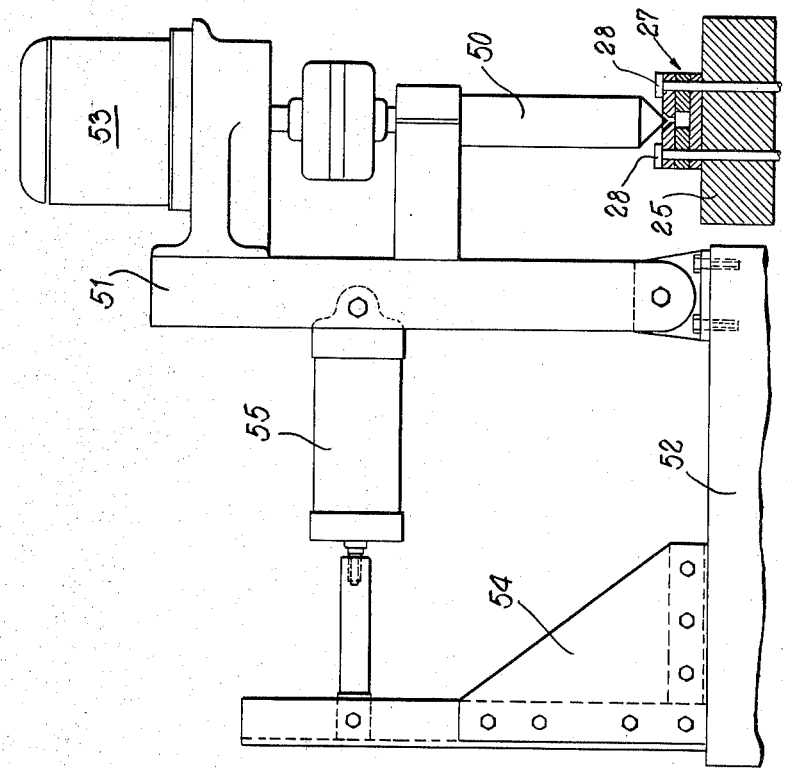
Fig. 4 shows on an enlarged scale an elevation of the injection means.

Adjacent the end of the tunnel 49 having the more closely spaced elements but externally thereto is a 1" screw type injector 50, Fig. 4, which can be lowered to charge a closed mold. The injector 50 is mounted on an arm 51 pivoted to a fixed support 52. The injector is driven by a one horsepower electric motor 53 also mounted on the arm 51. A bracket 54 on the support 52 forms an anchorage for an air cylinder mechanism 55 linked to the arm 51. Operation of the air cylinder causes the arm 51 to rotate about its pivot and bring the nozzle of the injector 50 into or out of engagement with a filling orifice of one of the molds adjacent the end of the tunnel 49.

The method of operation will now be described.

The table drive 24 is started and each mold 27 in turn passes completely round so as to traverse the tunnel from one end to the other. The molds 27 may be considered to occupy 16 stations, Fig. 2, as they rotate with the table 20, the tunnel 49 covering stations 2 to 14 inclusive. At station 1 a mold 27 is closed, the rotary valve 31 in this position admitting hydraulic fluid to lower the appropriate cylinder 29. The injector 50 is lowered and operates to fill the mold cavity with uncured rubber. The mold then enters the tunnel 49 the injector 50 meanwhile being raised in readiness for the following mold. In the initial part of this travel within the tunnel the mold is brought up to curing temperature by the induction effect of the closely spaced conductors. The temperature of the mold is thereafter maintained due to the wider spacing of the conductors and the cure is effected during the time taken for the mold to traverse the remaining length of the tunnel. When the mold emerges at the other end at stations 15 and 16 the hydraulic cylinder 29 is operated by means of the rotary valve 31 to open the mold and the cured product is removed by a side blow detaching it from the sprue which has formed in the injection hole in the uppermost plate 40 as shown in Fig. 3. The sprue is lifted out and the mold is then closed in readiness for refilling. Stripping of the molds can be performed manually or mechanically. As thirteen of the sixteen molds are in the tunnel at any one time three remaining molds are available for filling and stripping. One mold is filled while the two others are stripped.

By using sixteen molds as described and allowing one-half minute for the dwell of the table and rotation between successive stations, the complete cycle takes eight minutes of which six and one-half minutes are the time for curing in the tunnel. By increasing the speed of operation to four minutes for a complete cycle a curing time of three and one-quarter minutes is given. Such arrangements would give production rates of 12,000 or 24,000 products per 100 hours.

A bank of machines of this type needs only a single operator to supervise, replenish the supply of rubber to the injectors and remove the accumulation of finished products.

Having described my invention, what I claim is:

1. A rotary molding machine comprising a rotatable table and intermittent drive therefor, a series of molds on said table arranged in a circle centered on the axis of rotation of said circle, each mold comprising a fixed platen forming the bottom of said mold, an intermediate mold part movable upwardly from said platen and an upper part movable upwardly from the intermediate part, means for moving the upper part from the intermediate part and for moving the intermediate part upwardly from the lower part to space said platen and said intermediate and upper parts from each other, injection means whereby each said mold is filled with moldable material through said upper part after closure while at a filling position, and heating means to heat said molds while passing from said filling position to an opening position whereby material in said molds may be heat treated.

2. The machine of claim 1 in which said heating means comprises an electric induction heater having a greater heating effect near the beginning of said passage than in the end part of said passage.

3. A rotary molding machine according to claim 1 wherein the lower plate is connected to the upper part by projections on said intermediate part engaging in vertical slotted strips secured to the upper plate.

4. A rotary molding machine according to claim 1 wherein the upper part is provided with a sprue opening to form a sprue sufficiently strong for a molded product to be lifted clear of the intermediate part and the platen by movement of the upper part.

5. A rotary molding machine according to claim 1 comprising hydraulic cylinders for opening and closing the molds and a fluid supply comprising a rotary control valve at the center of the table and a pump.

6. A rotary molding machine according to claim 1 comprising an injector carrying arm pivoted to a stationary part of the machine and means for rotating the arm about its pivot to lower the injector into injecting relationship with a filling orifice of a mold.

References Cited in the file of this patent

UNITED STATES PATENTS

| | | |
|---|---|---|
| 2,431,843 | Swoger | Dec. 2, 1947 |
| 2,487,426 | Cousino | Nov. 8, 1949 |
| 2,521,808 | Taylor | Sept. 12, 1950 |
| 2,568,771 | Smith | Sept. 25, 1951 |

FOREIGN PATENTS

| | | |
|---|---|---|
| 581,642 | Great Britain | Dec. 11, 1944 |